US012263564B2

(12) United States Patent
Shao et al.

(10) Patent No.: US 12,263,564 B2
(45) Date of Patent: Apr. 1, 2025

(54) WRENCH WITH PRESET TORQUE

(71) Applicant: Hangzhou Xinmai Technology Co., Ltd., Hangzhou (CN)

(72) Inventors: Jun Shao, Hangzhou (CN); Liang Hua, Hangzhou (CN); Linwei Xue, Hangzhou (CN); Qiliang Xu, Hangzhou (CN)

(73) Assignee: HANGZHOU XINMAI TECHNOLOGY CO., LTD., Hangzhou (CN)

( * ) Notice: Subject to any disclaimer, the term of this patent is extended or adjusted under 35 U.S.C. 154(b) by 373 days.

(21) Appl. No.: 17/986,985

(22) Filed: Nov. 15, 2022

(65) Prior Publication Data

US 2024/0131663 A1 Apr. 25, 2024
US 2024/0227134 A9 Jul. 11, 2024

(30) Foreign Application Priority Data

Oct. 19, 2022 (CN) ........................ 202211277291.X

(51) Int. Cl.
*B25B 23/142* (2006.01)
*B25B 23/16* (2006.01)

(52) U.S. Cl.
CPC ............ *B25B 23/142* (2013.01); *B25B 23/16* (2013.01)

(58) Field of Classification Search
CPC .............. B25B 23/142; B25B 23/1422; B25B 23/1425; B25B 23/1427; B25B 23/16
See application file for complete search history.

(56) References Cited

U.S. PATENT DOCUMENTS

| | | | | |
|---|---|---|---|---|
| 6,640,674 B1 * | 11/2003 | Rinner | B25B 23/1427 81/475 |
| 6,722,235 B2 * | 4/2004 | Hsieh | B25B 23/1427 81/478 |
| 7,044,036 B1 * | 5/2006 | Salazar | B25B 23/1427 81/478 |
| 7,765,900 B2 * | 8/2010 | Wu | B25B 23/1427 81/475 |
| 10,179,396 B2 * | 1/2019 | Hsieh | G01L 25/003 |
| 11,213,936 B2 * | 1/2022 | Chen | B25B 23/1427 |
| 11,745,319 B2 * | 9/2023 | Beckwith | B25B 23/1427 81/480 |
| 2012/0048073 A1 * | 3/2012 | Wu | B25B 23/1427 81/478 |

* cited by examiner

*Primary Examiner* — David B. Thomas
(74) *Attorney, Agent, or Firm* — MUNCY, GEISSLER, OLDS & LOWE, P.C.

(57) ABSTRACT

A wrench comprises a handle, a tube, an actuating-part and a scale mark area; the handle comprises a hollow rotation handle, a movable plug, a screw rod drive component and a locking component, an end of the hollow rotation handle engages with a tail end portion of the scale mark area by rotation, the screw rod drive component comprises a rotary portion and a screw rod portion, and an adjusting threaded-sleeve is sleeved over the screw rod portion; a tube positioning piece engaging with the rotary portion by rotation is provided on the rotary portion; the locking component comprises a handle insert and positioning pins, the handle insert is installed on the rotary portion via a key and an outer surface of the handle insert is connected with an inner surface of the hollow rotation handle, and positioning pins are provided at a front end portion of the movable plug.

9 Claims, 3 Drawing Sheets

WRENCH WITH PRESET TORQUE

TECHNICAL FIELD

The present invention relates to the technical field of wrenches, specifically a wrench with preset torque.

BACKGROUND TECHNOLOGY

A wrench is a commonly used installation and dismantling tool, and is a kind of manual tool configured for turning screws, bolts, nuts and openings of other thread tightened bolts or nuts or fasteners of bores taking advantage of the lever principle. For a wrench, usually an opening or holding jaw for slipping onto screws or nuts is provided at one or both ends of a handle of the wrench, and during use, by applying a force on the handle of the wrench along the rotation direction of the threads, the screws or the nuts can be turned.

Usually a main body of the wrench is a fixed structure, and the way to remove or fasten a tool with a wrench is by turning the wrench, and when turning a screw or a nut, the resistance is the biggest; for wrenches currently available, forces are applied continuously by hand operations, the screw or the nut is tightened with torque; in this way, the forces cannot be preset, it is not possible to control the magnitude of the torque, at present design of light weight articles (with aluminum, carbon fiber and refractories) has some requirements on the torque, and in overloading conditions the threads may be damaged and cannot be repaired.

SUMMARY OF THE INVENTION

A purpose of the present invention is to provide a wrench with preset torque, to address the problems discussed in the background technology.

To realize the foregoing purpose, the present invention provides the following technical solution:

A wrench with preset torque, comprises a handle, a tube, an actuating part and a scale mark area, wherein an end of the tube is interpolated inside the scale mark area, an rocker arm of the actuating part extends into the tube, and cooperates with the tube via rotary movements, a front end portion of the actuating part is configured to conduct tool installation and dismantling work; the handle is provided at a tail portion of the scale mark area; the handle comprises a hollow rotation handle, a movable plug, a screw rod drive component and a locking component, an end portion of the hollow rotation handle cooperates with the scale mark area via rotary movements, and an end of the tube that extends into the scale mark area extends into the hollow rotation handle, the movable plug is provided at a tail end portion of the hollow rotation handle and is adjustable by pulling backwards, the screw rod drive component comprises a rotary portion and a screw rod portion, an adjusting threaded sleeve is sleeved over the screw rod portion and the adjusting threaded sleeve is slidable axially in the hollow rotation handle; the screw rod portion can drive the adjusting threaded sleeve to move during rotation, the adjusting threaded sleeve can drive the rocker arm to pivot against wherein the rocker arm is connected with the tube; a tube positioning piece is provided on the rotary portion and the tube positioning piece engages with the rotary portion by rotation, and the tube positioning piece is integrally connected with the tube; the locking component comprises a handle insert and a plurality of positioning pins, the handle insert is installed on the rotary portion via at least one key, and an outer portion of the handle insert is connected with an inner surface of the hollow rotation handle, the plurality of positioning pins are provided at a front end portion of the movable plug, the plurality of positioning pins pass through at least one hole in the handle insert, and is inserted into at least one positioning hole provided at a tail end surface of the tube positioning piece, wherein, the plurality of positioning holes at the tail end surface of the tube positioning piece is circumferentially distributed.

On the basis of the foregoing technical solution, the present invention further provides the following optional technical solutions:

In one of the optional technical solutions: a step is provided at a connection area between the screw rod portion and the rotary portion, a front end surface of the tube positioning piece is connected with the step via a plane bearing; a positioning ring groove is provided at an outer surface of the rotary portion, lateral screw holes are provided at a side wall of the tube positioning piece, and the tube positioning piece is fixed on the tube via cooperation between grub screws and the lateral screw holes, and end portions of the grub screws extend into the positioning ring groove.

In one of the optional technical solutions: at least one screw hole is provided at an end surface of the handle insert that faces the tube positioning piece, a ball-catch screw is installed in the at least one screw hole, a recess is provided at a front end portion of the ball-catch screw, and a first steel ball and a first spring are installed in the recess; the first steel ball is placed at a front end portion of the recess and the first steel ball is movable freely, an end of the first spring is connected with an inner surface of the recess and another end of the first spring is abutted against the first steel ball; and the first steel ball can be placed in the at least one positioning hole.

In one of the optional technical solutions: at least one positioning block is provided at an outer surface of the tube positioning piece, and at least one slot for engaging with the positioning block is provided at a tail end portion of the tube, positioning of the tube positioning piece and the tube can be done by engagement between the at least one positioning block and the at least one slot in the tube.

In one of the optional technical solutions: the movable plug comprises a wing portion and a plug, the plug extends into an opening in the tail end portion of the hollow rotation handle, and a plurality of positioning pins are circumferentially distributed on an end surface of the plug; and the wing portion is provided at a tail end portion of the plug and closes the tail end portion of the hollow rotation handle.

In one of the optional technical solutions: the rotary portion passes through a center of the plug and two limiting ring-shaped grooves are provided at a tail end portion of the rotary portion; a positioning screw hole extending until an inner cavity of the plug is provided at an outer surface of the plug, a positioning spring and a positioning steel ball is provided in the positioning screw hole, the positioning steel ball is provided in an end portion of the positioning screw hole that is close to the inner cavity of the plug and is movable freely; and the positioning spring is compressed and the positioning steel ball is pushed against an outer portion of the rotary portion.

In one of the optional technical solutions: a movable slot is provided at a tail end portion of the movable plug, the tail end portion of the rotary portion passes through the movable slot, a stopper piece is fixed at the tail end portion of the rotary portion via tail end fixing screws, a movable space is formed between the stopper piece and an end portion of the plug, and the movable space is closed during pulling the movable plug so that a pulling distance of the movable plug can be limited; wherein, a sealing ring groove is provided on a surface of the plug, and flexible connection is provided between the sealing ring groove and the inner surface of the hollow rotation handle.

In one of the optional technical solutions: an observation window is provided at an outer surface of the scale mark area and a scale ring is provided at an inner surface of the scale mark area, ten equally-divided scale marks are provided circumferentially on a surface of the scale ring, a scale plate is connected on the adjusting threaded sleeve, the scale plate extends into the scale mark area in between the tube and the scale mark area and the observation window corresponds to the scale plate.

In one of the optional technical solutions: at least one torque spring and at least one gliding block are provided in the tube, the at least one gliding block is provided in the tube and is slidable, during moving, the at least one gliding block pushes the rocker arm to pivot against the tube, and the at least one gliding block is connected with the adjusting threaded sleeve via the at least one torque spring.

Compared with the prior art, beneficial effects of the present invention are that:

1. In the present invention, by driving the actuating part to rotate by turning the handle and having the actuating part reach a preset torque, dismantling and installation of tools at a certain torque can be done; with this method, sliding friction is changed to be rolling friction, and no hole is drilled at the tail end portion, in this way, aesthetical appearance is enhanced while no part will fall off, during use, safety index is higher, threads of the tools will be properly protected and the driving parts are hidden in the tube, which looks pleasant;
2. In the present invention, the locking component can limit rotation of the screw rod drive component so that the actuating part is maintained stable after rotating for some degrees, in addition, the way that the locking component locks the screw rod drive component is to pass the positioning pins through holes in the handle insert and then into the positioning holes at the tail end surface of the tube positioning piece, so as to position the rotation angle of the screw rod drive component, preset pushing force can be executed definitely so as to facilitate tool installation and dismantling; and
3. The structure of the device disclosed in the present invention is simple, by configuring the rotation handle to be drive force for dismantling tools, adjustment is more convenient and effortless, and generally in conditions where there are specific torque requirements, the present wrench is more convenient and of high utility.

Figure 1:
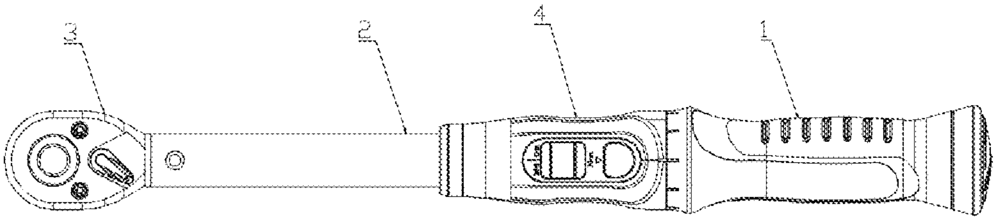
FIG. 1 is a schematic diagram showing entire structures of a wrench as disclosed in an embodiment of the present invention.

Reference signs in the drawings are: handle 1, tube 2, actuating part 3, scale mark area 4, scale ring 41, observation window 42, hollow rotation handle 5, movable plug 6, wing portion 61, plug 62, cap 63, rotary portion 7, screw rod 8, adjusting threaded sleeve 9, tube positioning piece 10, positioning block 101, positioning hole 102, locking screw hole 103, grub screw 104, handle insert 11, lateral screw hole 111, ball-catch screw 113, tail fixing screw 12, stopper 13, positioning pin 14, positioning spring 15, positioning steel ball 16, sealing ring groove 17, scale plate 18, limiting ring groove 19, positioning screw hole 20, rocker arm 21, torque spring 22 and gliding block 23.

EMBODIMENTS

To make the purpose, technical solutions and advantages of the present invention more clear and apparent, hereinafter the present invention will be further described in details in conjunction with the accompanying drawings and the embodiments; in the drawings or the description, similar or identical parts use the same reference signs, and during application, shapes, thickness or heights of the parts can be enlarged or reduced. The embodiments described in the present invention are only intended to explain the present invention rather than limit the scope of the present invention. Any obvious modification or changes to the present invention doesn't depart from the spirit and scope of the present invention.

In an embodiment, as shown in FIGS. 1-4, a wrench with preset torque, comprises a handle 1, a tube 2, an actuating part 3 and a scale mark area 4, an end of the tube 2 is interpolated in the scale mark area 4, a rocker arm 21 of the actuating part 3 extends into the tube 2 and engages with the tube 2 by rotation, and a front end portion of the actuating part 3 is configured to execute tool dismantling work;

The handle 1 is provided at a tail end portion of the scale mark area 4; the handle 1 comprises a hollow rotation handle 5, a movable plug 6, a screw rod drive component and a locking component, an end portion of the hollow rotation handle 5 engages with a tail end portion of the scale mark area 4 by rotation, and an end portion of the tube 2 extending into the scale mark area 4 extends inside the hollow rotation handle 5, the movable plug 6 is provided at a tail end portion of the hollow rotation handle 5 and can be pulled backwards, the screw rod drive component comprises a rotary portion 7 and a screw rod portion 8, an adjusting threaded sleeve 9 is sleeved over the screw rod portion 8, and the adjusting threaded sleeve 9 is axially slidable inside the hollow rotation handle 5; the screw rod portion 8 can drive the adjusting threaded sleeve 9 to move during rotation, the adjusting threaded sleeve 9 can drive the rocker arm 21 to pivot against where the rocker arm 21 is connected with the tube 2;

A tube positioning piece 10 is provided on the rotary portion 7, the tube positioning piece 10 is connected with the tube 2 to form an integral part; the locking component comprises a handle insert 11 and a plurality of positioning pins 14, the handle insert 11 is installed on the rotary portion 7 via keys and an outer surface of the handle insert 11 is connected with an inner surface of the hollow rotation handle 5, the plurality of positioning pins 14 are provided at a front end portion of the movable plug 6, the plurality of positioning pins 14 pass through holes in the handle insert 11, and pass through positioning holes 102 provided on a tail end surface of the tube positioning piece 10, wherein, the positioning holes 102 on the tail end surface of the tube positioning piece 10 are distributed circumferentially; wherein the tube positioning piece 10 is connected with the tube 2 via screws.

In the present embodiment, by pulling the movable plug 6 backwards, the plurality of positioning pins 14 leave the positioning holes 102, and by rotating the hollow rotation handle 5 and driving the handle insert 11 to rotate, the handle insert 11 can drive the rotary portion 7 to rotate, so does the screw rod portion 8; as the screw rod portion 8 engages with threads on the adjusting threaded sleeve 9, relative displacement happens between the screw rod portion 8 and the adjusting threaded sleeve 9; thereafter, the adjusting threaded sleeve 9 pushes the rocker arm 21 to rotate against where the rocker arm 21 is connected with the tube 2; in this way, the actuating part 3 is turned, a front end portion of the actuating part 3 can dismantle tools quickly, which is effortless; when pushing the movable plug 6 forward, the plurality of positioning pins 14 are interpolated into the positioning holes 102, the tube positioning piece 10 is connected with the handle insert 11, as the tube positioning piece 10 is integrally connected with the tube 2, rotation of the handle insert 11 is restricted, as a result, rotation of the hollow rotation handle 5 is limited too, in this way, the screw rod drive component is locked and thus fixed; wherein the positioning holes 102 can correspond to a distance of rotation and advancement, so as to realize accurate adjustment of rotation of the actuating part 3; and the rocker arm 21 is connected with the tube 2 at a front end portion of the tube 2.

Figure 2:
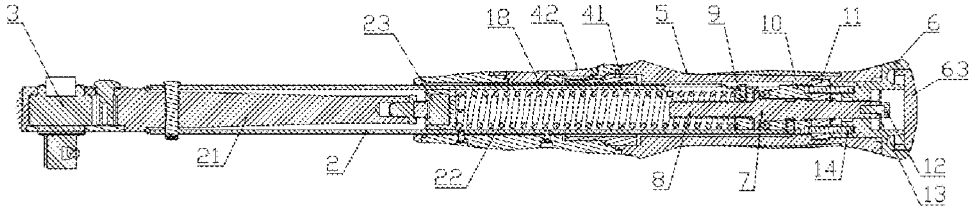
FIG. 2 is a structural schematic diagram showing a first cross section of the wrench as disclosed in an embodiment of the present invention.
Figure 3:
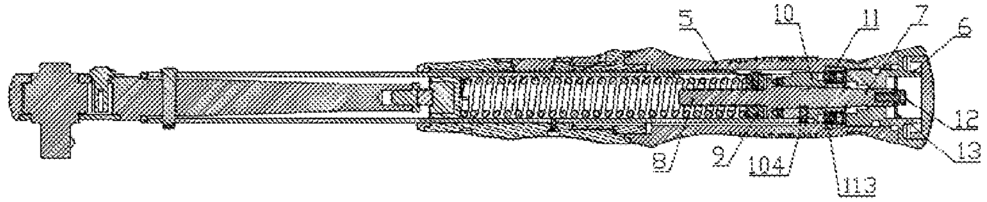
FIG. 3 is a structural schematic diagram showing a second cross section of the wrench as disclosed in an embodiment of the present invention.

In an embodiment, as shown in FIG. 2 and FIG. 3, a step is provided at where the screw rod portion 8 is connected with the rotary portion 7, a front end portion of the tube positioning piece 10 is connected with the step via a plane bearing; a positioning ring groove is provided at an outer surface of the rotary portion 7, lateral screw holes 103 are provided at a side wall of the tube positioning piece 10, the tube positioning piece 10 is fixed on the tube 2 via cooperation of grub screws 104 and the lateral screw holes 103, and end portions of the grub screws 104 extend into the positioning ring groove so as to realize positioning and installation of the tube positioning piece 10 on the rotary portion 7.

In an embodiment, as shown in FIGS. 2-5, at least one inner screw hole 111 is provided at an end surface of the handle insert 11 facing the tube positioning piece 10, at least one ball-catch bolt 113 is installed in the at least one inner screw hole 111, a recess is provided at a front end portion of each of the at least one ball-catch bolt 113, and a first steel ball and a first spring are installed in the recess; the first steel ball is provided at a front end portion of the recess and is movable freely, an end of the first spring is connected with an inner surface of the recess and another end thereof is abutted against the first steel ball; the first steel ball can be placed in the positioning holes 102; during rotation of the hollow rotation handle 5, the first steel ball in the at least one ball-catch bolt 113 rolls on an end surface of the tube positioning piece 10, and rolls into the positioning holes 102, so that the first ball is compressed and bounced back in between the end surface of the tube positioning piece 10 and the positioning holes 102, and during bounding, a sound is produced, which reminds that the handle insert 11 is turned for a division value.

Figure 4:
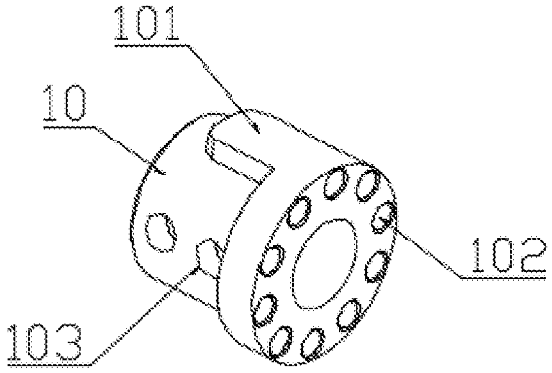
FIG. 4 is a structural schematic diagram showing a tube positioning piece as disclosed in an embodiment of the present invention.
Figure 5:
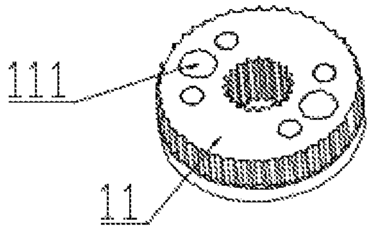
FIG. 5 is a structural schematic diagram showing a handle insert as disclosed in an embodiment of the present invention.

In an embodiment, as shown in FIG. 4, a positioning block 101 is provided at an outer surface of the tube positioning piece 10, a port engaging with the positioning block 101 is provided at a tail end portion of the tube 2, and by engagement between the positioning piece 101 and the port on the tube 2, positioning of the tube positioning piece 10 and the tube 2 can be realized.

In an embodiment, as shown in FIGS. 2-7, the movable plug 6 comprises a wing portion 61 and a plug 62, the plug 62 extends into an opening at the tail end portion of the hollow rotation handle 5, and the plurality of positioning pins 14 are distributed circumferentially on an end surface of the plug 62; the wing portion 61 is provided at a tail end portion of the plug 62 and closes the opening at the tail end portion of the hollow rotation handle 6; and configuration of the wing portion 61 can hide parts in the hollow rotation handle 5.

In an embodiment, as shown in FIGS. 2-7, the rotary portion 7 passes through a center of the plug 62, and two limiting ring grooves 19 are provided at a tail end portion of the rotary portion 7; a positioning screw hole 20 extending until an inner cavity of the plug 62 is provided on an outer surface of the plug 62, a positioning spring 15 and a positioning steel ball 16 are installed in the positioning screw hole 20, the positioning steel ball 16 is located at an end of the positioning screw hole 20 close to the inner cavity of the plug 62 and is movable freely; the positioning spring 15 is compressed and pushes the positioning steel ball 16 against the outer surface of the rotary portion 7; during pulling the movable plug 6, the positioning steel ball 16 slides between the two limiting ring grooves 19, and when the positioning steel ball 16 slides into the limiting ring grooves a sound is pronounced, so that positioning of the movable plug 6 during pulling can be realized and a pulling distance of the movable plug 6 and the plurality of positioning pins 14 can be controlled.

Figure 6:
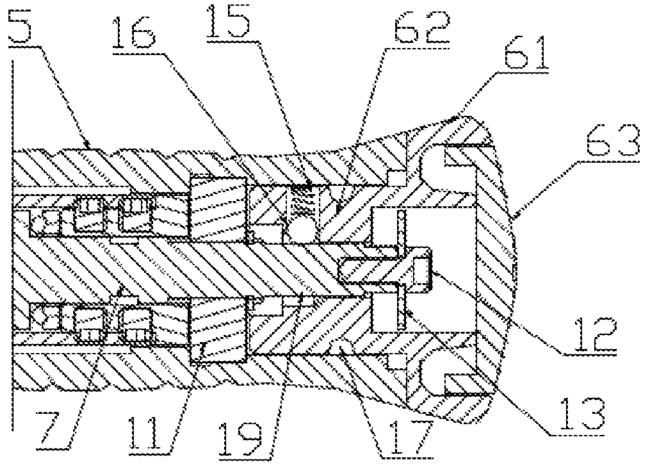
FIG. 6 is a structural schematic diagram showing a cross section of a handle of the wrench as disclosed in an embodiment of the present invention.
Figure 7:
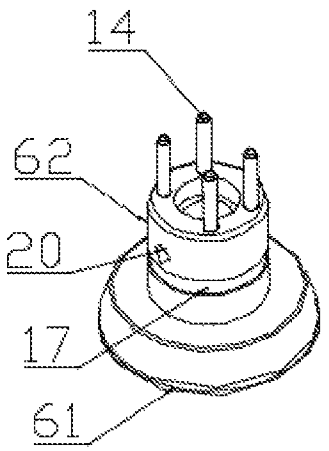
FIG. 7 is a structural schematic diagram showing a movable plug of the wrench as disclosed in an embodiment of the present invention.

In an embodiment, as shown in FIG. 6, a movable slot is provided at a tail end portion of the movable plug 6, a tail end portion of the rotary portion 7 extends into the movable slot, a stopper 13 is fixed at the tail end portion of the rotary portion 7 by at least one tail end fixing screw 12, a movable space is formed in between the stopper 13 and an end surface of the plug 62, during pulling the movable plug 6 can be stopped by the stopper 13, so as to limit a pulling distance of the movable plug 6. Wherein, a sealing ring groove 17 is provided at a surface of the plug 62, flexible connection is provided between the sealing ring groove 17 and the hollow rotation handle 5 so that during pulling, a damping sense is produced. Wherein, a cap 62 is provided at a rear portion of the movable plug 6 so as to cover the opening.

In an embodiment, as shown in FIGS. 2-3, an observation window 42 is provided on an outer surface of the scale mark area 4, and a scale ring 41 is provided at an inner surface of the scale mark area 4, ten equally-divided scale marks are circumferentially provided on a surface of the scale ring 41, a scale plate 18 is connected on the adjusting threaded sleeve 9, the scale plate 18 extends in between the scale mark area 4 and the tube 2, the observation window 42 corresponds to the scale plate 18; when turning the hollow rotation handle 5, by the scale ring 41 a turning angle of the hollow rotation handle 5 can be confirmed, the scale plate 18 can move along with the adjusting threaded sleeve 9, through the observation window 42 a moving distance of the scale plate 18 can be observed so as to adjust the moving distance of the adjusting threaded sleeve 9 and consequently control a turning degree of the actuating part 3.

In an embodiment, as shown in FIG. 2, torque springs 22 and a gliding block 23 are provided in the tube 2, the gliding block 23 is provided in the tube 2 and is slidable therein, the gliding block 23 can push the rocker arm 21 to pivot against where the rocker arm 21 is connected with the tube 2, the gliding block 23 is connected with the adjusting threaded sleeve 9 via the torque springs 22; when the hollow rotation handle 5 is turned for a certain degree, the adjusting threaded sleeve 9 moves for some distance, so that the torque springs 22 push flexibly the gliding block 23, and the gliding block 23 in turn drives the rocker arm 21 to rotate so as to exert a certain turning force on the actuating part 3 and dismantling and installation of tools can be done effortlessly.

The foregoing are only some embodiments of the present invention, however, the protection scope of the present disclosure is not limited to the embodiments disclosed here, any changes or replacement that any one skilled in the art can easily come up with shall be covered in the protection scope of the present invention. Therefore, the protection scope of the present disclosure shall be subject to the protection scope of the claims only.

The invention claimed is:

1. A wrench with preset torque, comprises a handle, a tube, an actuating part and a scale mark area, wherein an end of the tube is interpolated inside the scale mark area, a rocker arm of the actuating part extends into the tube, and cooperates with the tube via rotary movements, a front end portion of the actuating part is configured to conduct tool installation and dismantling work; the handle is provided at a tail portion of the scale mark area; the handle comprises a hollow rotation handle, a movable plug, a screw rod drive component and a locking component, an end portion of the hollow rotation handle cooperates with the scale mark area via rotary movements, and an end of the tube that extends into the scale mark area extends into the hollow rotation handle, the movable plug is provided at a tail end portion of the hollow rotation handle and is adjustable by pulling backwards, the screw rod drive component comprises a rotary portion and a screw rod portion, an adjusting threaded sleeve is sleeved over the screw rod portion and the adjusting threaded sleeve is slidable axially in the hollow rotation handle; the screw rod portion can drive the adjusting threaded sleeve to move during rotation, the adjusting threaded sleeve can drive the rocker arm to pivot against wherein the rocker arm is connected with the tube; a tube positioning piece is provided on the rotary portion and the tube positioning piece engages with the rotary portion by rotation, and the tube positioning piece is integrally connected with the tube; the locking component comprises a handle insert and a plurality of positioning pins, the handle insert is installed on the rotary portion via at least one key, and an outer portion of the handle insert is connected with an inner surface of the hollow rotation handle, the plurality of positioning pins are provided at a front end portion of the movable plug, the plurality of positioning pins pass through at least one hole in the handle insert, and is inserted into at least one positioning hole provided at a tail end surface of the tube positioning piece, wherein, the plurality of positioning holes at the tail end surface of the tube positioning piece is circumferentially distributed.

2. The wrench with preset torque according to claim 1, wherein a step is provided at a connection area between the screw rod portion and the rotary portion, a front end surface of the tube positioning piece is connected with the step via a plane bearing; a positioning ring groove is provided at an outer surface of the rotary portion, lateral screw holes are provided at a side wall of the tube positioning piece, and the tube positioning piece is fixed on the tube via cooperation between grub screws and the lateral screw holes, and end portions of the grub screws extend into the positioning ring groove.

3. The wrench with preset torque according to claim 2, wherein at least one screw hole is provided at an end surface of the handle insert that faces the tube positioning piece, a ball-catch screw is installed in the at least one screw hole, a recess is provided at a front end portion of the ball-catch screw, and a first steel ball and a first spring are installed in the recess; the first steel ball is placed at a front end portion of the recess and the first steel ball is movable freely, an end of the first spring is connected with an inner surface of the recess and another end of the first spring is abutted against the first steel ball; and the first steel ball can be placed in the at least one positioning hole.

4. The wrench with preset torque according to claim 3, wherein at least one positioning block is provided at an outer surface of the tube positioning piece, and at least one slot for engaging with the positioning block is provided at a tail end portion of the tube, positioning of the tube positioning piece and the tube can be done by engagement between the at least one positioning block and the at least one slot in the tube.

5. The wrench with preset torque according to claim 1, wherein the movable plug comprises a wing portion and a plug, the plug extends into an opening in the tail end portion of the hollow rotation handle, and a plurality of positioning pins are circumferentially distributed on an end surface of the plug; and the wing portion is provided at a tail end portion of the plug and closes the tail end portion of the hollow rotation handle.

6. The wrench with preset torque according to claim 5, wherein the rotary portion passes through a center of the plug and two limiting ring-shaped grooves are provided at a tail end portion of the rotary portion; a positioning screw hole extending until an inner cavity of the plug is provided at an outer surface of the plug, a positioning spring and a positioning steel ball is provided in the positioning screw hole, the positioning steel ball is provided in an end portion of the positioning screw hole that is close to the inner cavity of the plug and is movable freely; and the positioning spring is compressed and the positioning steel ball is pushed against an outer portion of the rotary portion.

7. The wrench with preset torque according to claim 6, wherein a movable slot is provided at a tail end portion of the movable plug, the tail end portion of the rotary portion passes through the movable slot, a stopper piece is fixed at the tail end portion of the rotary portion via tail end fixing screws, a movable space is formed between the stopper piece and an end portion of the plug, and the movable space is closed during pulling the movable plug so that a pulling distance of the movable plug can be limited; wherein, a sealing ring groove is provided on a surface of the plug, and flexible connection is provided between the sealing ring groove and the inner surface of the hollow rotation handle.

8. The wrench with preset torque according to claim 1, wherein an observation window is provided at an outer surface of the scale mark area and a scale ring is provided at an inner surface of the scale mark area, ten equally-divided scale marks are provided circumferentially on a surface of the scale ring, a scale plate is connected on the adjusting threaded sleeve, the scale plate extends into the scale mark area in between the tube and the scale mark area and the observation window corresponds to the scale plate.

9. The wrench with preset torque according to claim 1, wherein at least one torque spring and at least one gliding block are provided in the tube, the at least one gliding block is provided in the tube and is slidable, during moving, the at least one gliding block pushes the rocker arm to pivot against the tube, and the at least one gliding block is connected with the adjusting threaded sleeve via the at least one torque spring.

* * * * *